Sept. 29, 1964 A. J. NERAD 3,150,944
ROTARY APPARATUS FOR SEPARATING SOLID PARTICLES FROM GAS
Filed Oct. 27, 1960
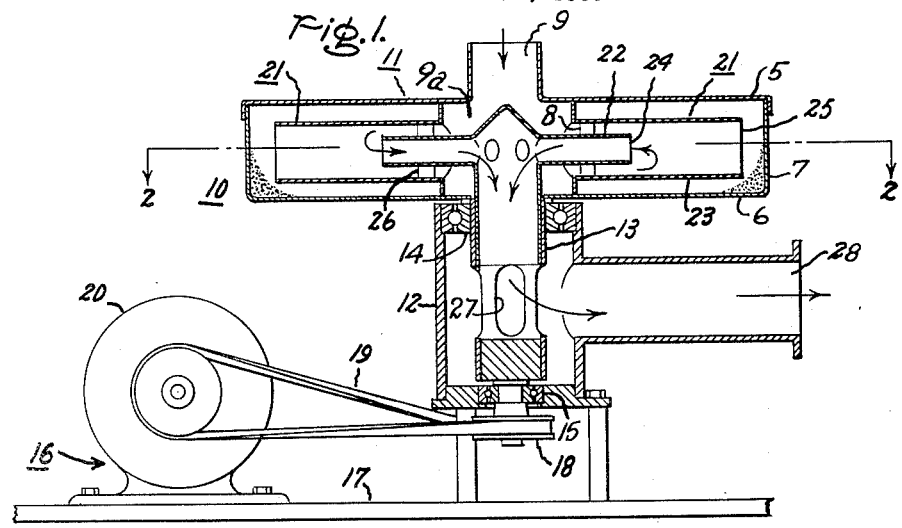
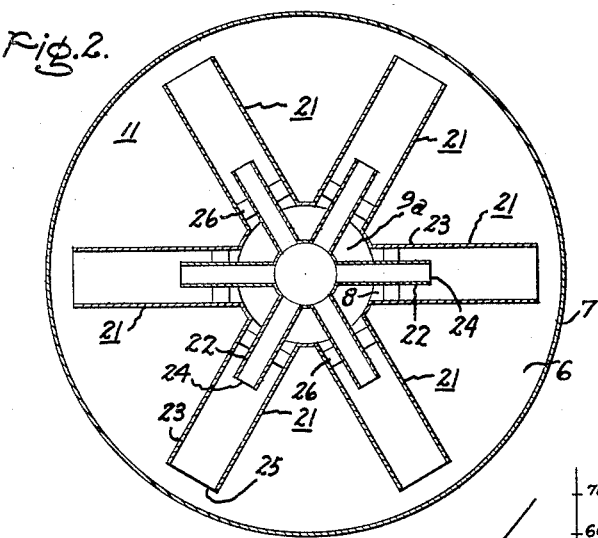
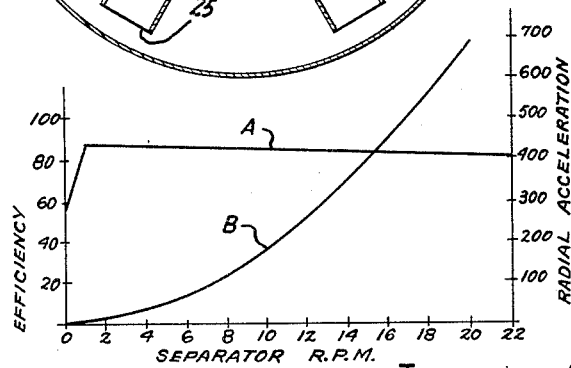
Inventor:
Anthony J. Nerad
by James J. Lichiello
His Attorney.

United States Patent Office 3,150,944
Patented Sept. 29, 1964

3,150,944
ROTARY APPARATUS FOR SEPARATING SOLID
PARTICLES FROM GAS
Anthony J. Nerad, Alplaus, N.Y., assignor to General
Electric Company, a corporation of New York
Filed Oct. 27, 1960, Ser. No. 65,354
7 Claims. (Cl. 55—409)

This invention relates to dust separators and more particularly, to an improved rotating type centrifugal dust collector.

Because of the more widespread use of internal combustion engines for larger industrial operations, power plants, etc., and because of the ever increasing industrial expansion, more attention is being given to the present and recurring problem of atmosphere pollution. Most industries which previously had discharged large amounts of foreign materials into the atmosphere are now employing dust collectors and separators generally of the cyclone-type or electric precipitator type. Pollution of the atmosphere may also be caused by large amounts of combustion products discharged into the atmosphere from hydrocarbon combustion apparatus, such as internal combustion engines and more particularly, for example, from gas turbine locomotives and other power plants employing solid hydrocarbons, such as coal powder or dust for fuel. It is also a further problem that where the products of combustion of internal combustion engines or other air streams contain energy and are to be put to further use, the dust particles entrained therein are injurious to equipment and these power sources may not, therefore, be gainfully employed to the best advantage.

One of the most efficient dust or particle collectors or separators is a properly designed cyclone-type of collector. These collectors generally comprise a cylindrical or conical casing into which a dust laden gas is caused to move axially in a vortical manner to reverse and flow out through a concentrically positioned tubular exit projecting therein. These collectors, however, have efficiencies which are primarily based upon gas velocities, although with higher gas velocities large pressure losses are entailed. For application to a gas turbine locomotive utilizing coal dust as fuel, these cyclone-type collectors must be of very large size or in plural form which raises their initial cost and space requirements. It is, therefore, desirable to have a compact highly efficient dust collector or separator occupying restricted spaces for use in apparatuses discharging injurious particle or dust laden gases into the atmosphere.

Accordingly, it is an object of this invention to provide an improved dust collector.

It is another object of this invention to provide an improved rotating-type dust collector.

It is another object of this invention to provide a combination of a cyclone and rotary-type dust collector.

It is another object of this invention to provide a dust collector of increased efficiency.

It is another object of this invention to provide a dual force field type of dust collector.

It is another and further object of this invention to provide an improved dust collector operable with reduced pressure losses for the high velocity gases.

Briefly described, this invention contemplates employing a plurality of cyclone-type dust collectors disposed in radial array similar to the spokes in a wheel with a central and common air inlet, and rotating the wheel form to provide a second force field in the form of centrifugal force for better particle separation.

This invention will be better understood when taken in connection with the following descriptions and figures in which:

FIG. 1 is a schematic cross section and elevational view of one embodiment of this invention;
FIG. 2 is an illustration of FIG. 1 along the line 2–2; and
FIG. 3 is a graph illustrating the variation in efficiency of a separator constructed according to this invention and the variation in radial acceleration corresponding to various speeds of rotation.

Referring now to FIG. 1, there is disclosed one preferred embodiment of this invention. The apparatus 10 of FIG. 1 includes a casing 11 defined by a top surface 5, a bottom surface 6, and a peripheral surface 7, and which is adapted for rotation on a suitable base 12. Casing 11 has attached there to a shaft structure 13 which is mounted on or positioned in base 12 for rotation, by one or more bearing assemblies 14 and 15. Various power means may be suitably employed to rotate shaft structure 13, including various mechanical drives and power take off assemblies from a unit being serviced. One power means is illustrated in FIG. 1 as an electrical motor drive assembly 16. Drive assembly 16 includes a base plate or support 17 upon which shaft structure 13 is mounted. A pulley or drive member 18 is attached to the shaft structure 13 and is driven by a flexible drive 19 around a suitable pulley member on motor 20. Operation of the described drive assembly rotates casing 11 in the horizontal plane as illustrated. Casing 11 includes a plurality of cyclone-type dust collectors 21 aranged in wheel form, as best shown in FIG. 2, which rotate about a transverse axis which is coaxial or coincident with the axis of rotation of said casing.

Referring now to Fig. 2, casing 11 contains, for example, six cyclone-type dust collectors or separators 21 arranged and spaced radially equally distant from each other similar to spokes in a wheel, and spaced from said casing. Separators 21 are illustrated as imperforate tubes 23 with an air inlet opening 8 at one end and a dust exit opening 25 at the other end. Each separator 21 is connected in fluid flow relationship to a common distribution chamber 9a, which is in turn connected to and in communication with the inlet or opening 9 in top surface 5 and rotates with casing 11 by being suitably attached thereto. Each separator 21 includes a tube 22 which is concentrically positioned and spaced within a tube 23. The end 24 of tube 22 is substantially spaced from the end 25 of tube 23. Turning vanes 26 are employed around each tube 22 between tubes 22 and 23 to provide vortical or whorling air motion. Tubes 23 are centrally joined to common distribution chamber 9a via which the dust-laden fluid is supplied to tubes 23, while tubes 22 are joined to hollow shaft structure 13 and are not open to chamber 9a, except insofar as all tubes 22 and chamber 9a communicate with tube 23 as shown (FIG. 1). The cyclone separator thus comprises an imperforate tube 23 wherein there is provided an axially moving whorling motion of dust laden air. The dust from this air is caused to move out of tube 23 from the open exit end 25 while clean air is removed centrally of the whorling air mass by means of clean air exit tubes 22. Tubes 22 remove the clean air from the inlet opening end of separator tube 23 by means of opening 24. The design and construction of such a cyclone-type dust collector or separator 21 is well known and established in the art and various dimensional relationships are available for their preferred concentricity, diameter, length, etc. An empirical relationship which may be employed in the construction of the cyclone-type dust collector as employed in this invention may be found in "Chemical Engineers Handbook," McGraw-Hill, 3rd ed., 1950, page 1024 and preceding and subsequent pages.

Referring again to FIG. 1, the air path and/or the operation of the centrifugal separator may be best described as follows. Motor 20 is operated to provide a speed in r.p.m. of casing 11 of about 100 r.p.m. Dust laden air under pressure from, for example, the combustion chamber of a coal burning gas turbine locomotive enters inlet 9, passes into the centrally-located distribution chamber 9a from which the dust-laden air flows radially outwardly through vanes 26. By means of properly oriented vanes 26, the dust laden air is given a vortical or helical motion to flow around tube 22 and along tube 23 towards exit end 25. By means of the vane elements 26 which apply a whirling vortical movement to the air, dust particles are thrown radially outwardly against the walls of tube 23 to move towards and out of exit end 25 and deposit dust particles in casing 11. Superimposed on the abovementioned helical motion is the effect of the rotational movement of the entire assembly within casing 11 about the central axis of shaft 13. As a result, the dust particles are subjected to a second force field in the form of centrifugal, or axial force with respect to the tube, which aids in forcing the dust particles out of the tube 23. Dust particles are, therefore, subject to two force fields, one of which produces vortical motion of the air to urge the dust particles radially against the walls of tube 23, and the other of which, the centrifugal force field caused by rotation of the assembly, urges the particles radially out from the axis of rotation of hollow shaft 13 and thus longitudinally out of tube 23. Discharging of clean air is accomplished by the air reversing from the central region of tube 23 to flow into end 24 of tube 22. Upon reversal, therefore, substantially clean air enters opening 24 in tube 22 to flow into the hollow shaft structure 13. By means of suitable openings 27 in the hollow shaft structure 13, clean air exits through exit 28. The centrifugal rotating type of dust collector provides an apparatus and design operable with much higher inlet gas velocities without the attended penalty of higher pressure losses. Furthermore, the centrifugal force field acting axially of the tube 23 aids in preventing short circuiting, i.e., dust particles being taken up by the discharging clean air stream just prior to entering exit end 24.

The apparatus as described, has been tested with six cyclone separators 21 (FIG. 2) and using graphite dust as a test dust because its density is near that of fly ash the prevalent dust particle in the combustion gases of coal burning gas locomotives and generally because it is readily available, noncombustible, and not abrasive. Using Stokes' Law, the terminal settling velocity of a spherical particle of a given size and density and in a known force field can be calculated. Also, according to Stokes' Law a given size of particle has a definite terminal settling velocity directly proportional to the number of G's (gravitational acceleration) applied to the particle. Since the distance a particle moves is the product of resultant acceleration and (time)$^2$, it can be seen that the efficiency of an individual separator design will depend in large part on the maximum number of G's that can be applied to the particle to make it move in a desired direction, the length of time the force is applied and the ability of the separator to collect and return the particles that have been separated. Since it may take several hundred to several thousand G's to separate small dust particles at a reasonable rate from the air, it is, of course, possible to accelerate the process or aid in the retention of the smaller dust particles by applying an additional force field, i.e., a centrifugal force field at approximately right angle to the main force field created by the vortical air motion.

The efficiency of the apparatus was calculated using, as a test medium, graphite, of about 325 mesh, the average particle diameter being less than about 44 microns. Efficiency was calculated on the basis of measured amount or weight of graphite added to the inlet air at 22 and comparing this to the weight of graphite present in the exiting stream at 26. The formula used was $$E = \frac{IW - AW}{IW}$$

where E is efficiency, IW is the inlet weight of graphite and AW is the average weight of graphite per pass through the separator.

FIG. 3 is a curve illustrating the efficiency of the separator of this invention as based upon various r.p.m.'s, with curve A being the curve representing the efficiency and curve B being radially acceleration of dust particles based on r.p.m. It is to be noted that maximum efficiency of about 90% was obtained with a separator r.p.m. of about 100 r.p.m. This efficiency is substantially higher than referred to cyclone-type collector employed for fly ash removal. Examination of curve B indicates that much less than 100 G's are required at maximum efficiency; i.e. at about 100 r.p.m.

A second series of tests were made with the separator of FIG. 1 both running and stationary to determine the weight efficiency. Results indicate a clear gain of 15% to 20% efficiency with the separator operating.

It is thus understood by those skilled in the art that an improved dust collector has been disclosed which utilizes a plurality of cyclone-type dust collectors together with rotary motion to provide improved separator efficiencies by the addition of centrifugal forces acting at right angles to the vortical forces in the air mass. These efficiencies averaged about 90% compared with average cyclone-type dust collector efficiencies of a maximum of about 80%.

While a specific embodiment has been disclosed and described, it is not intended that this invention be limited to such, and various modifications may be apparent to those skilled in the art and are included in the scope of the appended claims.

What I claim as new and desire to secure by Letters Patent of the United States is:

1. A rotary apparatus for separating solid particles from gas comprising in combination:
 (a) a first longitudinally-extending conduit,
  (1) said first conduit being completely defined in the lateral direction by imperforate wall area and having open ends,
 (b) means for distributing particle-laden gas to said first conduit,
  (1) said first conduit adjacent one open end thereof being mounted on said distributing means and extending outwardly therefrom,
   (a) said first conduit being in flow communication with said distributing means through said one open end of said first conduit thereby permitting passage of particle-laden gas from said distributing means through said first conduit for exit through the other open end thereof,
 (c) a rotatably-mounted hollow shaft having a closed end,
  (1) said closed end extending into the interior of said distributing means,
  (2) said distributing means being mounted on and supported by the hollow shaft for rotation thereby,
 (d) a second longitudinally-extending conduit extending through said one open end and into said first conduit for a distance,
  (1) said second conduit being completely defined in the lateral direction by imperforate wall area, having a first open end and a second open end, and being affixed to said hollow shaft adjacent said first open end for rotation by said hollow shaft,
  (2) said second conduit being in flow communication with the interior of said hollow shaft through said first open end and in flow communication with the center region of said first conduit through said second open end, thereby enabling the flow of substantially particle-free gas from said center region inwardly to the interior of said hollow shaft, (e) vortical whirl means disposed at positions uniformly spaced around the outer perimeter of said second conduit at a location in the path of flow of the particle-laden gas from said distributing means into said first conduit, (1) said vortical whirl means symmetrically distributing the particles in the particle-laden gas into helical paths of travel over the perimeter of the inner surface of said first conduit downstream of said location and adjacent thereto as particle-laden gas passes from said distributing means into said first conduit, (f) means connected to said hollow shaft and in flow communication with the interior thereof for receiving therefrom the substantially particle-free gas collected therein, and (g) means for rotating said hollow shaft and the elements mounted for rotation therewith thereby simultaneously subjecting the particles in said first conduit to a first force urging the particles away from said center region of said first conduit and toward said inner surface thereof and to a second force urging the particles away from said second open end of said second conduit and toward said other open end of said first conduit.

2. Rotary apparatus for separating solid particles from gas as recited in claim 1 wherein the conduits are tubes with the second conduit being of smaller diameter than the first conduit.

3. A rotary apparatus for separating solid particles from gas comprising in combination:

(a) a first longitudinally-extending conduit,
(1) said first conduit being completely defined in the lateral direction by imperforate wall area and having open ends, (b) means for distributing particle-laden gas to said first conduit,
(1) said first conduit adjacent one open end thereof being mounted on said distributing means and extending outwardly therefrom,
(a) said first conduit being in flow communication with said distributing means through said one open end of said first conduit thereby permitting passage of particle-laden gas from said distributing means through said first conduit for exit through the other open end thereof, (c) a rotatably-mounted hollow shaft having a closed end,
(1) said closed end extending into the interior of said distributing means,
(2) said distributing means being mounted on and supported by the hollow shaft for rotation thereby with said first conduit extending in a direction substantially perpendicular to the axis of rotation of said hollow shaft, (d) a second longitudinally-extending conduit extending substantially co-axially through said one open end and into said first conduit for a distance,
(1) said second conduit being completely defined in the lateral direction by imperforate wall area, having a first open end and a second open end, and being affixed to said hollow shaft adjacent said first open end for rotation by said hollow shaft,
(2) said second conduit being in flow communication with the interior of said hollow shaft through said first open end and in flow communication with the center region of said first conduit through said second open end, thereby enabling the flow of substantially particle-free gas from said center region inwardly to the interior of said hollow shaft, (e) vortical whirl means disposed at positions uniformly spaced around the outer perimeter of said second conduit at a location in the path of flow of the particle-laden gas from said distributing means into said first conduit,
(1) said vortical whirl means symmetrically distributing the particles in the particle-laden gas into helical paths of travel over the perimeter of the inner surface of said first conduit downstream of said location and adjacent thereto as particle-laden gas passes from said distributing means into said first conduit, (f) means connected to said hollow shaft and in flow communication with the interior thereof for receiving therefrom the substantially particle-free gas collected therein, and (g) means for rotating said hollow shaft and the elements mounted for rotation therewith thereby simultaneously subjecting the particles in said first conduit to a first force urging the particles away from said center region of said first conduit and toward said inner surface thereof, and to a second force urging the particles away from said second open end of said second conduit and toward said other open end of said first conduit.

4. Rotary apparatus for separating solid particles from gas as recited in claim 3 wherein the conduits are tubes with the second conduit being of smaller diameter than the first conduit.

5. A rotary apparatus for separating solid particles from gas comprising in combination:

(a) a first longitudinally-extending conduit,
(1) said first conduit being completely defined in the lateral direction by imperforate wall area and having open ends, (b) means for distributing particle-laden gas to said first conduit,
(1) said first conduit adjacent one open end thereof being mounted on said distributing means and extending outwardly therefrom,
(a) said first conduit being in flow communication with said distributing means through said one open end of said first conduit thereby permitting passage of particle-laden gas from said distributing means through said first conduit for exit through the other open end thereof, (c) a rotatably-mounted hollow shaft having a closed end,
(1) said closed end extending into the interior of said distributing means,
(2) said distributing means being mounted concentrically about and supported by the hollow shaft for rotation thereby with said first conduit extending in a direction substantially perpendicular to the axis of rotation of said hollow shaft, (d) a second longitudinally-extending conduit extending substantially co-axially through said one open end and into said first conduit for a distance,
(1) said second conduit being completely defined in the lateral direction by imperforate wall area, having a first open end and a second open end, and being affixed to said hollow shaft adjacent said first open end for rotation by said hollow shaft,
(2) said second conduit being in flow communication with the interior of said hollow shaft through said first open end and in flow communication with the center region of said first conduit through said second open end, thereby enabling the flow of substantially particle-free gas from said center region inwardly to the interior of said hollow shaft, (e) vortical whirl means disposed at substantially equal intervals around the outer perimeter of said second conduit at a location in the path of flow of the particle-laden gas from said distributing means into said first conduit,
- (1) said vortical whirl means symmetrically distributing the particles in the particle-laden gas into helical paths of travel over the perimeter of the inner surface of said first conduit downstream of said location and adjacent thereto as particle-laden gas passes from said distributing means into said first conduit, (f) means connected to said hollow shaft and in flow communication with the interior thereof for receiving therefrom the substantially particle-free gas collected therein, and (g) means for rotating said hollow shaft and the elements mounted for rotation therewith thereby simultaneously subjecting the particles in said first conduit to a first force urging the particles away from said central region of said first conduit and toward said inner surface thereof and to a second force urging the particles away from said second open end of said second conduit and toward said other open end of said first conduit.

6. Rotary apparatus for separating solid particles from gas as recited in claim 5 wherein the conduits are tubes with the second conduit being of smaller diameter than the first conduit and the introducing means is formed as a cylinder of revolution.

7. A rotary apparatus for separating solid particles from gas comprising in combination:
(a) a plurality of first tubes,
- (1) each of said first tubes being completely defined in the lateral direction by imperforate wall area and having open ends, (b) cylindrically-shaped means for distributing particle-laden gas to the first tubes,
- (1) each of said first tubes adjacent one open end thereof being mounted on and disposed about said distributing means extending radially outwardly from the periphery thereof,
  - (a) each of said first tubes being in flow communication with said distributing means through said one open end of said first tube thereby permitting passage of a particle-laden gas from said distributing means through said first tubes for exit through the other open ends thereof, (c) a rotatably-mounted hollow drive shaft having a closed end,
- (1) said closed end extending into the interior of said distributing means,
- (2) said distributing means being mounted concentrically about and supported by the hollow drive shaft for rotation thereby with each of said first tubes extending substantially perpendicular to the axis of rotation of said hollow drive shaft, (d) a plurality of second tubes equal in number to said first tubes and arranged in pairs with said first tubes with each of said second tubes extending substantially co-axially through said one open end of a separate one of said first tubes and into the first tube for a distance,
- (1) each of said second tubes being completely defined in the lateral direction by imperforate wall area, having a first open end and a second open end, and being affixed to said hollow drive shaft adjacent said first open end for rotation by said hollow drive shaft,
- (2) each of said second tubes being in flow communication with the interior of said hollow drive shaft through said first open end and in flow communication with the center region of the first tube paired therewith through said second open end, thereby enabling the flow of substantially particle-free gas from each of said center regions inwardly to the interior of said hollow drive shaft, (e) vortical whirl vanes disposed at uniform intervals around the outer perimeter of each of said second tubes at a location at which the outer surface of the second tube is in juxtaposition with the inner surface of the first tube paired therewith,
- (1) said vortical whirl vanes being in the path of flow of the particle-laden gas from said distributing means to said first tubes symmetrically distributing the particles in the particle-laden gas into helical paths of travel over the perimeter of the inner surface of said first tubes downstream of said locations and adjacent thereto as particle-laden gas passes from said distributing means into said first tubes, (f) means connected to said hollow drive shaft and in flow communication with the interior thereof for receiving therefrom the substantially particle-free gas collected therein, and (g) means for rotating said hollow drive shaft and the elements mounted for rotation therewith thereby simultaneously subjecting the particles in each of said first tubes to a first force urging the particles away from said central region of said first tube and toward said inner surface thereof and to a second force urging the particles away from said second open end of each of said second tubes and toward said other open end of said first tube.

References Cited in the file of this patent

UNITED STATES PATENTS

| 1,501,144 | Stone | July 15, 1924 |
| 2,317,785 | Loftheim | Apr. 27, 1943 |
| 2,780,309 | Loftheim | Feb. 5, 1957 |
| 2,812,828 | Yellott et al. | Nov. 12, 1957 |

FOREIGN PATENTS

| 48,991 | Austria | July 25, 1911 |
| 173,438 | Austria | June 15, 1952 |
| 887,446 | Germany | Aug. 24, 1953 |